(12) United States Patent
Campbell et al.

(10) Patent No.: US 8,605,262 B2
(45) Date of Patent: Dec. 10, 2013

(54) TIME SHIFTED PN CODES FOR CW LIDAR, RADAR, AND SONAR

(75) Inventors: Joel F. Campbell, Poquoson, VA (US); Narasimha S. Prasad, Yorktown, VA (US); Fenton W. Harrison, Windsor, VA (US); Michael A. Flood, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 188 days.

(21) Appl. No.: 13/167,093

(22) Filed: Jun. 23, 2011

(65) Prior Publication Data

US 2011/0317147 A1 Dec. 29, 2011

Related U.S. Application Data

(60) Provisional application No. 61/357,687, filed on Jun. 23, 2010.

(51) Int. Cl.
*G01C 3/08* (2006.01)
(52) U.S. Cl.
USPC .......................................... 356/5.09; 356/4.01
(58) Field of Classification Search
USPC ........ 356/4.01, 5.09, 445, 337, 484, 401, 432
See application file for complete search history.

(56) References Cited

U.S. PATENT DOCUMENTS

| 6,157,341 | A | * | 12/2000 | Silvestrin et al. | 342/357.68 |
|---|---|---|---|---|---|
| 7,359,057 | B2 | | 4/2008 | Schwiesow | |
| 7,361,922 | B2 | * | 4/2008 | Kameyama et al. | 250/574 |
| 7,616,888 | B2 | | 11/2009 | Mendenhall et al. | |
| 7,995,917 | B2 | * | 8/2011 | Mendenhall et al. | 398/25 |
| 2007/0008534 | A1 | * | 1/2007 | Lo et al. | 356/401 |
| 2010/0208231 | A1 | * | 8/2010 | Murai | 356/4.01 |

OTHER PUBLICATIONS

N. Takeuchi et al., "Random modulation cw lidar." Applied Optics, May 1, 1983, pp. 1382-1386, vol. 22, No. 9.
Adam Rybaltowski et al., "Signal-to-noise ratio in direct-detection mid-infrared Random-Modulation Continuous-Wave lidar in the presence of colored additive noise," Optics Express, Oct. 8, 2001, pp. 386-399. vol. 9, No. 8.
Adam Rybaltowski et al., "New modulation sequence for Random-Modulation Continuous-Wave lidar," SPIE, 2002, pp. 216-223, vol. 4484.
Adam Rybaltowski et al., "Figure of merit and fundamental range limitations in surface sensing direct-detection mid-infrared Random-Modulation Continuous-Wave lidar," SPIE. 2002, pp. 32-36, vol. 4546.

(Continued)

*Primary Examiner* — Isam Alsomiri
*Assistant Examiner* — Samantha K Abraham
(74) *Attorney, Agent, or Firm* — Andrea Z. Warmbier; Robin W. Edwards

(57) ABSTRACT

A continuous wave Light Detection and Ranging (CW LiDAR) system utilizes two or more laser frequencies and time or range shifted pseudorandom noise (PN) codes to discriminate between the laser frequencies. The performance of these codes can be improved by subtracting out the bias before processing. The CW LiDAR system may be mounted to an artificial satellite orbiting the earth, and the relative strength of the return signal for each frequency can be utilized to determine the concentration of selected gases or other substances in the atmosphere.

18 Claims, 6 Drawing Sheets

(56) References Cited

OTHER PUBLICATIONS

Adam Rybaltowski et al., "Superior signal-to-noise ratio of a new AA1 sequence for random-modulation continuous-wave lidar," Optics Letters, Aug. 1, 2004. pp. 1709-1711, vol. 29. No. 15.

Nobuo Takeuchi et al "Diode-laser random-modulation cw lidar," Applied Optics. Jan. 1, 1986, pp. 63-67, vol. 25. No. 1.

Shumpei Kameyama et al., "Development of 1.6 um continuous-wave modulation hard-target differential absorption lidar system for CO2 sensing," Optics Letters, May 15, 2009, pp. 1513-1515: vol. 34, No. 10.

\* cited by examiner

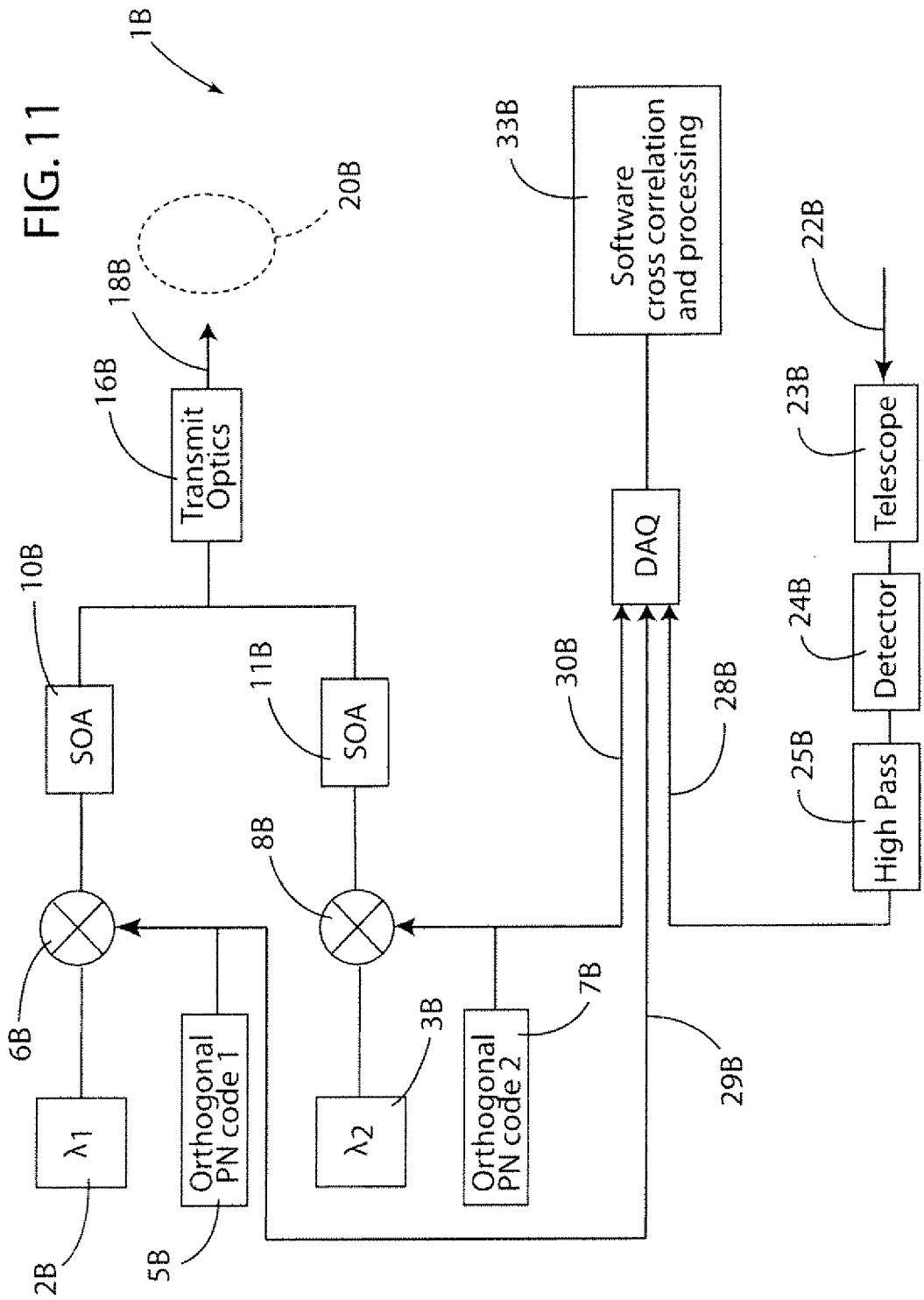

TIME SHIFTED PN CODES FOR CW LIDAR, RADAR, AND SONAR

CROSS-REFERENCE TO RELATED PATENT APPLICATIONS

This application claims the benefit of priority to U.S. Provisional Patent Application Ser. No. 61/357,687, filed on Jun. 23, 2010. The contents of the foregoing application are hereby incorporated by reference in their entirety.

STATEMENT REGARDING FEDERALLY SPONSORED RESEARCH OR DEVELOPMENT

The invention was made by employees of the United States Government and may be manufactured and used by or for the Government of the United States of America for governmental purposes without the payment of any royalties thereon or therefore.

FIELD OF THE INVENTION

The present invention relates generally to range detection and absorption utilizing Light Detection And Ranging (LiDAR), radar, sonar, or other signal.

BACKGROUND OF THE INVENTION

Various types of LiDAR, radar, and sonar have been developed to measure range. In addition to measuring distance, LiDAR has been utilized to measure the concentration of gases or other substances in the atmosphere. For example, LiDAR systems have been mounted in artificial satellites in orbit above the earth. Known differential absorption LiDAR transmits laser light with two wavelengths, and receives reflected light from the surface of the planet and/or gases or other substances in the atmosphere. An example of a known LiDAR technology is described in "Coherent Laser Radar Transceiver for the NASA $CO_2$ Laser Absorption Spectrometer Instrument" (edited by M. W. Phillips et al., Proceedings of $13^{th}$ Coherent Laser Radar Conference, 2005, pp. 118-121).

In differential absorption LiDAR systems, one of the two wavelengths is selected to have a relatively large absorption coefficient with respect to a specific gas to be measured, and the other wavelength is selected to have a relatively small absorption coefficient. Due to the differences in absorption coefficients, the amount of light that returns to the LiDAR detector depends upon the concentration of the gas or other substance to be measured. The concentration of the gas to be measured is determined from the difference between the amounts of light at the intensity of light detected at the two wavelengths.

Pseudorandom noise (PN) codes have been utilized in LiDAR and radar to measure distances. In general, a PN signal includes a sequence of pulses. The exact same sequence can be generated at both a transmitter and a receiver, such that the sequence generated by the receiver has a very high correlation with the transmitted sequence. However, known systems suffer from various drawbacks.

It is known that an AC coupled signal can be represented by:

$$S = \eta + \alpha\, pn^\Delta \qquad (1.0)$$

where $\eta$ is the noise, $\alpha$ is the attenuation factor and:

$$pn_i^\Delta = 2PN_{i^\Delta} - 1 \qquad (2.0)$$

where PN is the PN code represented by 1's and 0's and $\Delta$ represents the phase shift. The standard deviation of the noise can be represented by:

$$\sigma = \sqrt{\sum_{i=1}^{MN} \frac{(\eta_i - \eta_{ave})^2}{MN}} \qquad (3.0)$$

where we have summed over the total code length of the code, where M is the samples per code bit and N is the code bit length. After performing the correlation calculation, it is already known that the signal strength increases by a factor of MN where they are correlated. The correlation function of the total signal is:

$$\begin{aligned}
R(j) &= \sum_{i=1}^{MN} (\eta_i + \alpha\, pn_i^\Delta) pn_{i+j}^0 \\
&= \sum_{i=1}^{MN} \eta_i\, pn_{i+j}^0 + \alpha \sum_{i=1}^{MN} pn_i^\Delta\, pn_{i+j}^0 \\
&= \eta_j' + S_j'
\end{aligned} \qquad (4.0)$$

The standard deviation of the transformed noise $\eta'$ is assumed to have 0 mean (AC coupled). The variance can be determined by the equation:

$$(\sigma') = \langle (\eta')^2 \rangle = \frac{1}{MN} \sum_{j=1}^{MN} (\eta_j')^2 \qquad (5.0)$$

To find the sum:

$$(\eta_j')^2 = \sum_{m=1}^{MN} \eta_m\, pn_{m+j}^0 \sum_{n=1}^{MN} \eta_n\, pn_{n+j}^0 = \sum_{n,m} \eta_m \eta_n\, pn_{m+j}^0\, pn_{n+j}^0 \qquad (6.0)$$

so that:

$$(\sigma')^2 = \frac{1}{MN} \sum_{j=1}^{MN} \sum_{n,m}^{MN} \eta_m \eta_n\, pn_{m+j}^0\, pn_{n+j}^0 \qquad (7.0)$$

If the noise has 0 mean, the only part of the sum that will contribute is when n=m so:

$$\begin{aligned}
(\sigma')^2 &= \frac{1}{MN} \sum_{j=1}^{MN} \sum_{m}^{MN} \eta_m^2 (pn_{m+j}^0)^2 \\
&= \frac{1}{MN} \sum_{j=1}^{MN} \sum_{m}^{MN} \eta_m^2 \\
&= \frac{1}{MN} \sum_{j=1}^{MN} MN\sigma^2 \\
&= MN\sigma^2
\end{aligned} \qquad (8.0)$$

In the above since pn is either a 1 or –1, its square is always 1. The result is that:

$$\sigma' = \sqrt{MN}\,\sigma \qquad (9.0)$$

The new correlated snr in terms of the original snr is:

$$snr' = \frac{NM\alpha}{\sqrt{MN}\,\sigma} = \sqrt{MN}\,snr \qquad (10.0)$$

Expressed differently in terms of previously defined variables:

$$\frac{snr'}{snr} = \sqrt{MN} = \sqrt{\frac{samplerate}{codebitrate}N} \qquad (11.0)$$

This may be used in combination range and resolution equations in order to optimize the system.

In the event the signal processed with P codes back to back it is easy to verify that:

$$\frac{snr'}{snr} = \sqrt{MNP} = \sqrt{\frac{samplerate}{codebitrate}NP} \qquad (12.0)$$

This is useful because it says an entire block of data may be processed at once to get an averaging effect, and the signal to noise can be increased by simply taking a lot of data.

For noise with a 1/f power spectrum, it has been verified numerically that:

$$\frac{snr'}{snr} \geq \sqrt{MNP} = \sqrt{\frac{samplerate}{codebitrate}NP} \qquad (13.0)$$

BRIEF SUMMARY OF THE INVENTION

One aspect of the present invention is a method of measuring range and absorption of a transmitted signal. The transmitted signal may comprise light in the visible spectrum, electromagnetic waves, sound waves, or other suitable signal. The method includes generating first and second PN codes. The second PN code is substantially orthogonal to the first PN code. The method further includes generating a first signal at a first frequency or channel, wherein the first signal includes the first PN code. A second signal is generated at a second frequency or channel that is not equal to the first frequency. The second signal includes the second PN code. Additional PN codes and channels may also be utilized. A single carrier may be modulated by multiple orthogonal PN codes. The first and second signals are directed towards a target, and the return signal is detected. The return signal is correlated utilizing the first and second PN codes to provide first and second distinct amplitude peaks corresponding to the first and second PN codes. The method further includes determining a magnitude of the first amplitude peak, and a magnitude of the second amplitude peak. A ratio of the magnitudes of the first and second amplitude peaks is utilized to determine a relative absorption of the first and second signals.

These and other features, advantages, and objects of the present invention will be further understood and appreciated by those skilled in the art by reference to the following specification, claims, and appended drawings.

BRIEF DESCRIPTION OF THE DRAWINGS

FIG. 11 is a block diagram of a CW LiDAR system that does not include a carrier.

DETAILED DESCRIPTION OF PREFERRED EMBODIMENTS

For purposes of description herein, terms such as "upper," "lower," "right," "left," "rear," "front." "vertical," "horizontal," and derivatives may be utilized. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In atmospheric science it is useful to use PN codes at multiple laser wavelengths in order to measure absorption at specific ranges in order to, for example, discriminate the return of a cloud from the ground.

The present invention involves the use of time shifted PN codes for continuous wave (CW) LiDAR. In order to frame the requirements for use of time shifted PN codes, it is helpful to define the resolution and range in terms of known quantities.

The resolution is given by:

$$res = \frac{c}{2*bitrate}, \qquad (1.0)$$

where c is the speed of light and bitrate is the bitrate of the PN code. In our reference system res=3*10^8 meters/sec/(2*50000/sec)=3000 meters. The range is:

$$range=N*res. \qquad (2.0)$$

For instance with a PN code with a length of 256 the range would be 768 km, which is all the range that would be needed for a typical satellite-based LiDAR system. However, as discussed in more detail below, there are advantages to making the code longer.

Figure 1:
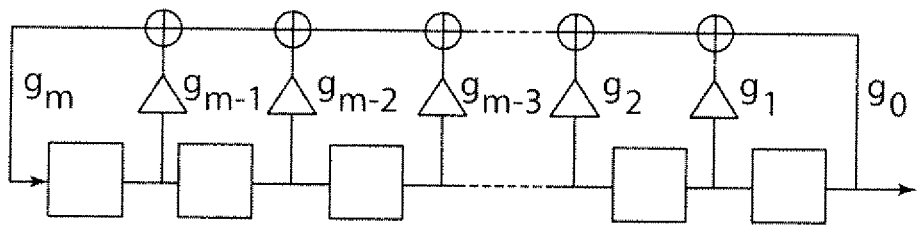
FIG. 1 is a partially fragmentary diagram of a shift register representation for generating in-sequence codes.

One known PN code is the m-sequence. The m-sequence is also the basis of many other PN codes. The m-sequences are advantageous because they have very good autocorrelation properties. M-sequences can be represented in a number of different ways. One known method utilizes linear feedback shift registers. An example of this implementation is shown in FIG. 1. In this arrangement, all additions are done using modulo 2 additions.

M-sequences may also be represented using a generator polynomial:

$$G = g_m x^m + g_{m-1} x^{m-1} + g_{m-2} x^{m-2} + \ldots + g_2 x^2 + g_1 x^1 + g_0. \quad (3.0)$$

Here the g's can be 1 or 0 and the sums are done using modulo two addition. However, $g_m = g_0 = 1$.

These sequences are $2^m - 1$ in length and only specific polynomials can be used for a particular length. For m=8 which corresponds to a code length of $2^8 - 1 = 255$ an allowed polynomial is:

$$G = x^8 + x^6 + x^5 + x^2 + 1. \quad (4.0)$$

In order to generate the individual bits, this can be represented by the recursion relation:

$$G[8+n] = G[n] \oplus G[n+2] \oplus G[n+5] \oplus G[n+6] \quad (5.0)$$

For the initial values of $G_0$-$G_7$ any sequence of 0's and 1's can be chosen as the seed as long as they are not all 0. For a seed of (1,0,1,0,1,1,1) we generate the sequence: (1, 0, 1, 0, 1, 1, 1, 1, 0, 0, 1, 1, 1, 0, 1, 0, 0, 0, 0, 1, 0, 1, 0, 1, 1, 0, 0, 1, 0, 1, 0, 0, 0, 1, 0, 1, 1, 0, 0, 0, 0, 1, 1, 0, 0, 1, 0, 0, 0, 1, 1, 0, 0, 0, 0, 1, 1, 0, 1, 0, 0, 0, 0, 1, 1, 1, 1, 1, 1, 0, 1, 1, 1, 0, 0, 0, 0, 1, 0, 0, 0, 0, 0, 1, 0, 0, 1, 0, 1, 0, 0, 1, 0, 1, 1, 1, 1, 1, 0, 0, 0, 0, 0, 0, 1, 1, 1, 1, 0, 1, 0, 1, 0, 1, 0, 1, 0, 1, 0, 0, 0, 0, 1, 0, 1, 1, 1, 1, 0, 1, 1, 1, 0, 0, 1, 1, 1, 1, 1, 1, 1, 1, 0, 0, 1, 0, 1, 1, 0, 1, 0, 1, 0, 1, 1, 1, 1, 0, 1, 0, 1, 0, 0, 1, 0, 1, 0, 1, 1, 0, 0, 1, 0, 1, 1, 0, 0, 1, 1, 1, 1, 0, 1, 1, 0, 1, 0, 1, 1, 0, 0, 0, 0, 0, 1, 1, 1, 1, 0, 1, 1, 1, 1, 1, 1, 0, 0, 0, 0, 0, 1, 0, 0, 0, 0, 1, 0, 0, 1, 0, 1, 0, 0, 1, 0, 1, 1, 1, 1, 1, 0, 0, 0, 0, 0, 0, 1, 1, 1, 1, 0, 1, 0, 1, 0, 1, 1, 1, 0, 0, 0, 1, 1, 1, 1)

The m-sequence codes have very good autocorrelation properties. The cross correlation between itself and a shifted version of itself is N when they are in sync and −1 if they are not, where N is the length of the code. It is also understood the codes are AC coupled before any correlation is done by changing all 0's in the code by −1. There are a number of ways of computing the correlation. One is by computing a table of:

$$R[n] = \sum_{n=0}^{N-1} A[m+n] B[m] \quad (6.0)$$

Figure 2:
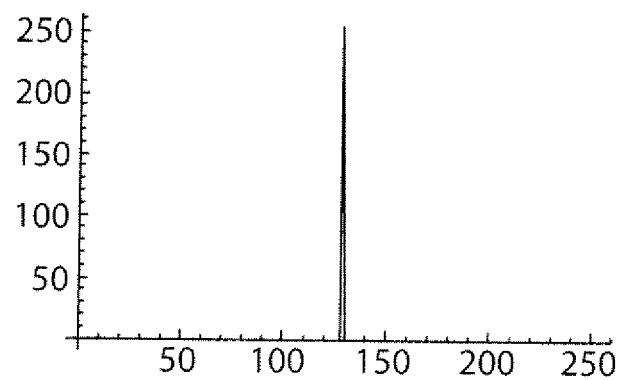
FIG. 2 is a graph showing the result of cross correlation of code and shifted code computed with a fast Fourier transform for a single channel system.

This may be defined differently by dividing by the length. Although this works, it requires something on the order of $N^2$ steps. Fourier transforms are generally better and faster. In this case:

$$R[n] = F^{-1}[F[A]F[B]^*] \quad (7.0)$$

where the * indicates the complex conjugate and F is the fast Fourier transform (FFT). This is superior because it only takes something on the order of N log N steps. As an example, the case in the previous section can be taken, and the cross correlation between it and a code shifted 128 places to the right can be computed. FIG. 2 shows the results of cross correlation of code and shifted code computed with FFT.

As a simulation, the return signal from a hard target may be represented as a combination of the delayed PN code in combination with noise. If M is the number of samples per bit of a Data Acquisition System (DAQ), and N is the length of the code, the strength of the signal after cross correlation will be N*M when the return signal and PN code are in sync, and −M when they are out of sync in the absence of noise.

Figure 3:
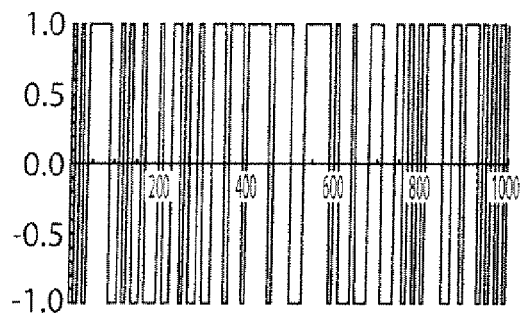
FIG. 3 is a graph of a return signal for a single channel system after subtracting noise.
Figure 4:
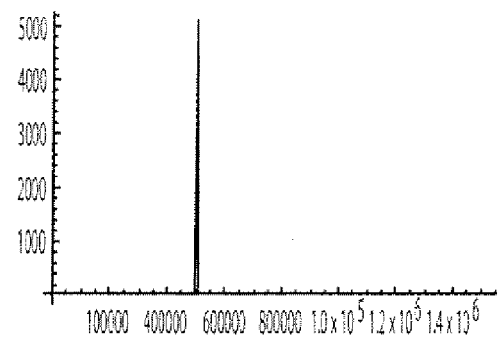
FIG. 4 is a graph of the return signal of FIG. 3 after correlation.
Figure 5:
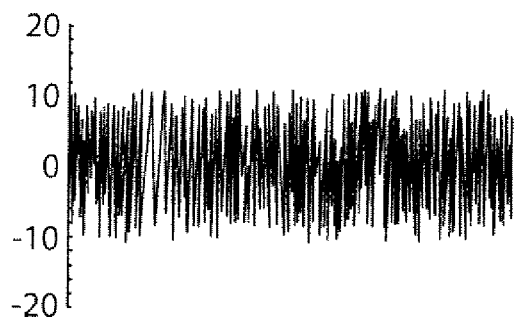
FIG. 5 is a graph of a return signal for a single channel system with 10× noise before correlation.
Figure 6:
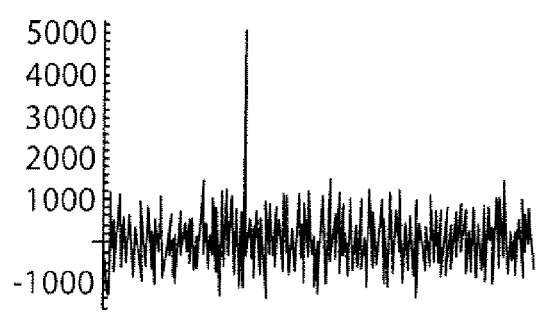
FIG. 6 is a graph showing a return signal for a single channel system with 10× noise after correlation.

As an example, 1 can be chosen as the amplitude of the return signal in combination with random noise 10 times that level. This example also utilizes a code that is 511 bits long, a bitrate of 50000 bits/sec, and a DAQ sample rate of 500000 samples/sec. This gives a resolution of 3 km and a range of 1533 km. A code with the generating function $G = x^9 + x^7 + x^5 + x^2 + 1$ and a seed of (1,0,1,0,1,1,1,1,1) is also chosen, as is a delay corresponding to 500 km. FIG. 3 shows the return signal for this example of a single channel system in absence of noise before correlation, and FIG. 4 shows the return signal after correlation for this example of a single channel system. FIG. 5 shows the same signal buried in noise that is 10 times the amplitude of the signal before correlation, and FIG. 6 shows the signal of FIG. 5 after correlation. The signal can be readily picked out after correlation.

The signal to noise ratio can be estimated. For purposes of discussion, white noise is first considered. It is possible to estimate the signal to noise ratio improvement before and after correlation. In this situation a DAQ samples the signal at:

$$M = \frac{samplerate}{bitrate} \quad (8.0)$$

samples per bit, where samplerate is the DAQ sample rate and bitrate is the PN code bit rate. This increases the apparent code length by M, which must be taken into account when applying the correlation calculation and the new code length becomes MN samples long.

In general, white noise may be computed as a series of pseudorandom numbers ranging from −1 to 1. To generate pink noise, white noise can be filtered with an FFT filter using $1/\sqrt{f}$ as a filter kernel, thereby giving it a power spectrum of 1/f. For atmospheric species detection it may be advantageous to be able to decode multiple channels. M-sequences (for example) may be utilized to construct a system with two or more channels. Since m-sequences have very good autocorrelation properties, shifted versions of them cross correlate well except for a small CD component where they are uncorrelated and a large spike where they correlate.

Also, if the LiDAR system is mounted to an artificial satellite and the LiDAR system is directed down from space, there will be a final hard target (the ground) below which there will be no further returns possible. If it is known that there will be no further returns past a certain distance, the LiDAR system can be sized with twice the range that is otherwise needed, and that further range can be used to add a second shifted code that is shifted by half the doubled range. To get twice the range a PN code twice as long is used, while maintaining the same code bit rate. As long as there are no returns beyond the half range there will be no interference between the channels. The first half of the autocorrelation gives the range information for the first unshifted channel, and the second half of the autocorrelation gives the range information for the shifted second channel. The autocorrelation for both channels can be done in a single step utilizing, for example, software that has been configured to perform the necessary calculations. By doubling the length of the code the signal to noise ratio (snr) is increased. In general, the code can be as long as needed to add the desired number of channels.

Figure 7:
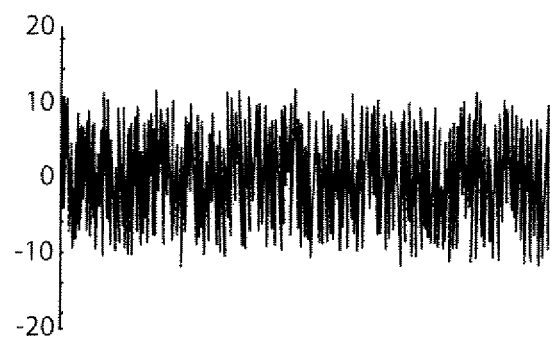
FIG. 7 is a graph of a return signal utilizing two codes in a double ranged system with two channels before correlation.
Figure 8:
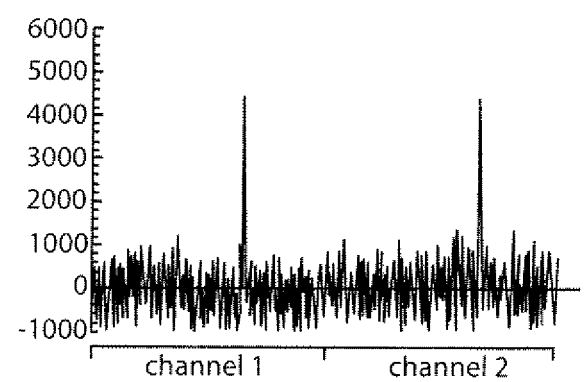
FIG. 8 is a graph of an example of a return signal utilizing two codes in a double ranged system with two channels after correlation.

FIGS. 7 and 8 show an example of using two codes in a double ranged system with two channels before (FIG. 7) and after (FIG. 8) correlation. The example of FIGS. 7 and 8 utilizes a code length of 511 with a sample rate of 500000 samples/sec and a code bit rate of 50000 bits/sec. This gives a total range of 511*3*10^5/(2*50000)=1533 km. A code with the generating function $G=x^9+x^7+x^5+x^2+1$, a seed of (1,0,1,0,1,1,1,1,1) and a shifted version of that code shifted 256 places to the right was used to generate the code. The result of this and 10× noise is show in FIG. 7. This example is similar to the example above (FIGS. 2-6), except that two channels are utilized.

In summary, two or more channels and two or more orthogonal PN codes are utilized, wherein each PN code is shifted in time. Two or more PN codes may be used on a single (or no) carrier. The shifting of the codes may be done such that there is equal spacing. The spacing between the time shifted sequences depends on the range. The minimum distance in bits must be:

$$n > \frac{2*br*R}{c} \quad (9.0)$$

where n is the distance in bits, br is the bitrate, R is the maximum range, and c is the speed of light. Also, a code must be selected that is at least as long as the sum of all the distances.

For instance, with two codes of length 511, the second is shifted to the right 256 places with respect to the first code. The shifting is done in such a way that as the end of the code is shifted past the boundary it wraps to the beginning. The maximum distance to the farthest target shall be 255 in that case. With four codes of length 511, each is shifted 128 places to the right of the preceding code. The maximum distance to the target in that case would be 127. In this way one may have multiple channels for a given code length. However, in general, the LiDAR/radar/sonar must be pointed at targets with a hard surface (such as the surface of the earth) no farther than the distance to the first code to avoid range-wrapping issues. In addition, it may be advantageous to either subtract the average from the code or from the data prior to processing to help alleviate noise/bias issues.

Figure 9:
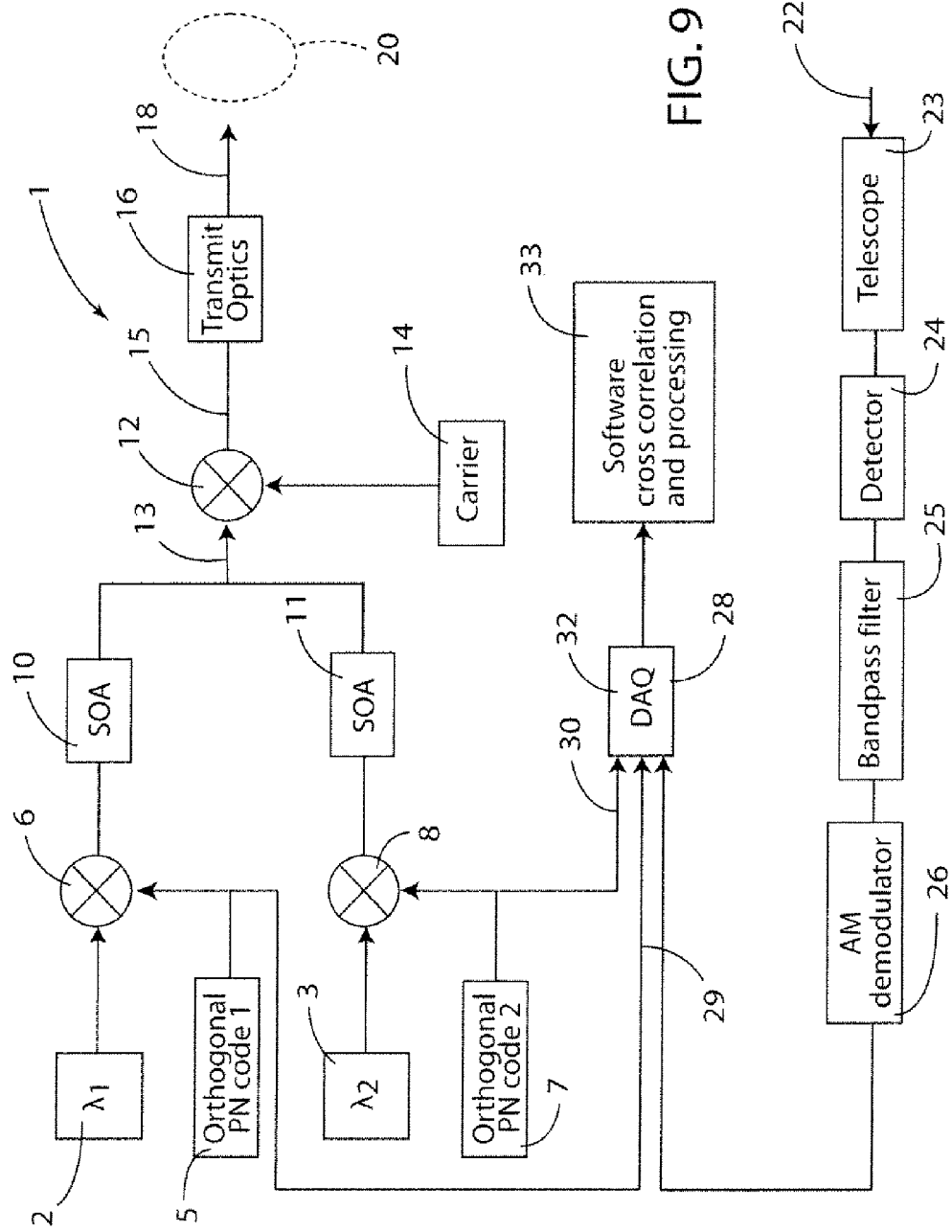
FIG. 9 is a block diagram of a CW LiDAR system with an AM modulated carrier.

With further reference to FIG. 9, a CW LiDAR system 1 according to one aspect of the present invention utilizes an AM modulated carrier. The CW LiDAR system 1 includes a first laser 2 and a second laser 3. Although various lasers having different wavelengths could be utilized, in the illustrated example the first and second lasers 2 and 3, respectively, may have a wavelength of about 1.57 microns. In general, the lasers 2 and 3 have slightly different wavelengths having different absorptions with respect to a particular gas or other substance. The first laser 2 may be selected to correspond to an absorption line of a particular chemical species. This depends on the chemical species to be measured. For example, there are numerous absorption lines at numerous different wavelengths. Thus, the wavelength of 1.57 microns is but one example of a suitable wavelength. In general, the second laser 3 has a different wavelength having a relatively small absorption coefficient with respect to the gas to be measured. Furthermore, one or more additional lasers (not shown) having wavelengths that are not equal to the wavelengths produced by the first and second lasers 2 and 3, respectively, may also be included in the CW LiDAR system 1. In general, the use of lasers having different wavelengths in differential absorption LiDAR is known, and the details with respect to selecting appropriate lasers for detecting a specific gas or other substance are not therefore described in detail herein.

A PN code generator 5 (see also FIG. 1) produces a first orthogonal PN code that is utilized to modulate the light from laser 2 as shown schematically at junction 6 of FIG. 9. Similarly, a PN code generator 7 modulates light from second laser 3 at junction 8. The PN code generators 5 and 7 may comprise a device or it may comprise software. It will be understood that FIG. 1 may represent a device, software, or it may be used as a mathematical representation for generating M1 sequences. Light from the junctions 6 and 8 is amplified by Semiconductor Optical Amplifiers (SOA's) 10 and 11, respectively, to amplify the signal. The optical signal 13 from SOA's 10 and 11 may be modulated to include a carrier signal as shown schematically in FIG. 9 by carrier 14 and junction 12. In the example of FIG. 9, an amplitude modulated carrier is utilized. However, the inclusion of a carrier may not be required for all applications, and it will therefore be understood that the AM and FM modulated carriers shown in FIGS. 9 and 10 respectively, are optional. Optical signal 15 is then supplied to transmit optical device 16, which produces an optical signal 18 that is directed towards a target. In FIG. 9, the target is shown schematically in dashed lines as a circle 20. However, it will be understood that the target may comprise clouds, gasses, the surface of a planet, or other features an interest.

Light reflected from target 20 returns in the form of a return signal 22 that is gathered by a telescope 23. The light is then converted into an electronic form by a detector 24, and the electronic signal is then processed by a band pass filter 25 and AM demodulator 26. It will be understood that the telescope 23, detector 24, band pass filter 25 and AM demodulator 26 are an example of an arrangement in accordance with an embodiment of the present invention. However, other devices and configurations may also be utilized. The demodulated signal 28, first PN code 29, and second PN code 30 are supplied to a Digital Acquisition System (DAQ) 32, and software 33 provides for software cross correlation and processing according to the method/processes discussed in more detail above. Signal bias may be removed by software 33 as discussed above.

Figure 10:
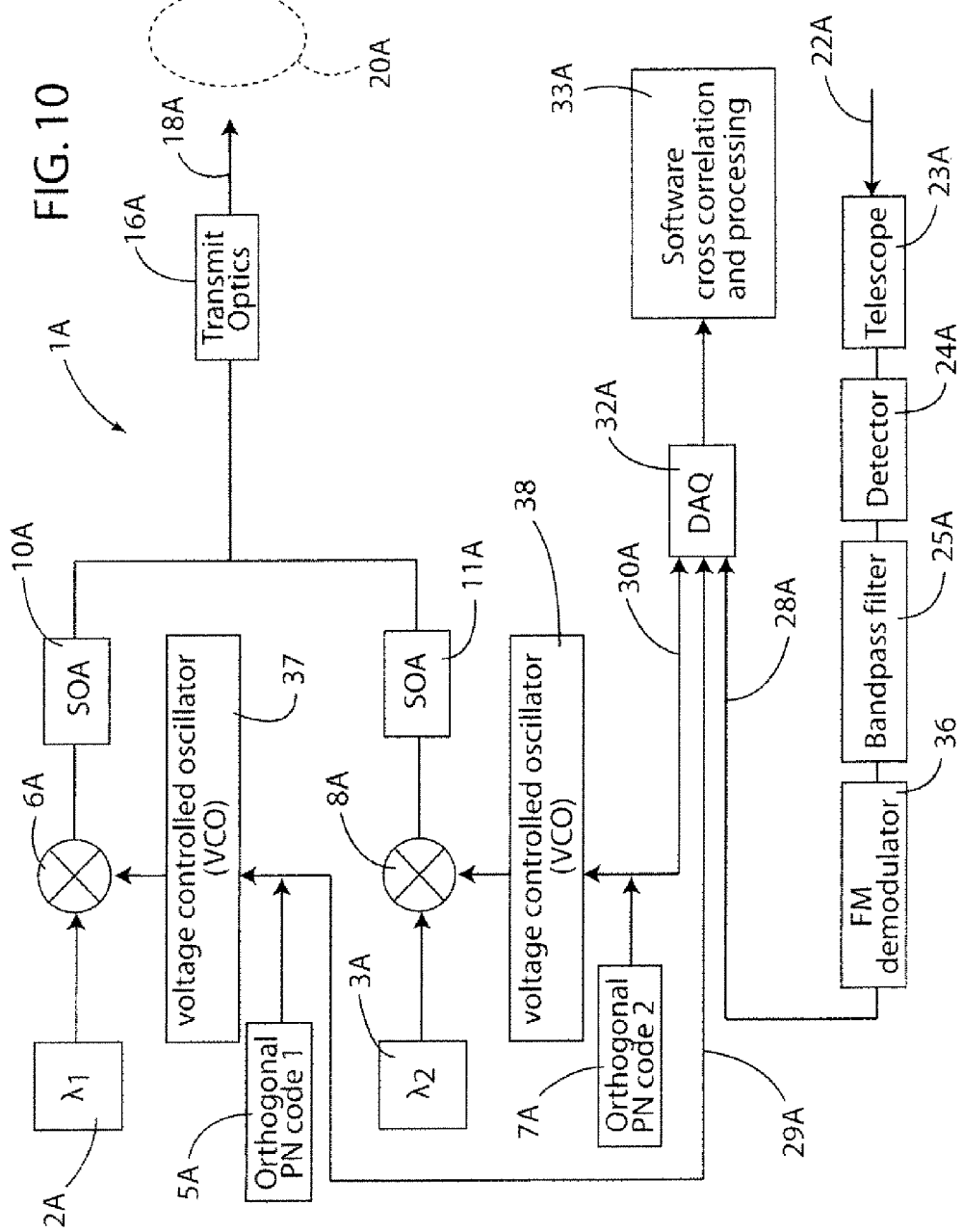
FIG. 10 is a block diagram of a CW LiDAR system with an FM modulated carrier.

With further reference to FIG. 10, an FM modulated CW LiDAR system 1A according to another aspect of the present invention includes many components that are substantially the same as the AM CW LiDAR system I of FIG. 9. The components of the FM CW LiDAR system 1A of FIG. 10 that are substantially similar to corresponding components of AM CW LiDAR system 1 of FIG. 9 are designated with the same part numbers, except that the suffix "A" has been added to the item numbers in FIG. 10. First and second orthogonal PN codes are provided by devices 5A and 7A. The orthogonal PN codes are provided to first and second Voltage Controlled Oscillators (VCO) 37 and 38, respectively, and light from first and second lasers 2A and 3A, respectively, is modulated at the junctions designated 6A and 11A. The combined optical signal 18A is directed towards a target 20A by transmit optics 16A. A return signal 22 is received by a telescope 23A, and is then converted into an electrical signal by detector 24A. The signal then passes through a band pass filter 25A and an FM demodulator 36. The first and second orthogonal PN codes are provided to a DAQ 32A by devices 5A and 7A, as is the demodulated electrical return signal 28A. Software 33A then provides cross correlation and processing as described in more detail above.

With further reference to FIG. 11, a CW LiDAR system 1B according to another aspect of the present invention is somewhat similar to the AM CW LiDAR system 1 of FIG. 9 and the FM CW LiDAR system of FIG. 10. However, the CW LiDAR system 1B does not utilize a carrier signal. The CW LiDAR system of FIG. 11 includes first and second lasers 2B and 3B, and devices 5B and 7B that generate orthogonal PN codes. Alternatively, device SB may generate unshifted PN code, and device 7B may generate PN code that is time shifted relative to the PN code generated by device 5B. The optical signal is amplified and transmitted towards a target 20B, and return signal 22B is received by a telescope 23B. A detector 24B and high pass filter 25B provide a signal 28B to DAQ 32B and software 33B for cross correlation and processing.

It will be understood that FIGS. 9-11 represent examples of ways to implement the present invention, but these examples are not intended to represent the sole ways to implement the invention. Various devices, software, and other such components may be utilized to implement the invention in LiDAR, radar and sonar systems.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A method of measuring absorption utilizing a transmitted optical signal, the method comprising:
providing a first laser that produces light having a first wavelength;
providing a second laser that produces light having a second wavelength that is not equal to the first wavelength;
generating at least one PN code;
modulating light produced by the first laser utilizing the PN code to provide a first outgoing optical signal comprising light at the first wavelength, the first outgoing optical signal including first PN code data;
modulating light produced by the second laser utilizing the PN code to provide a second outgoing optical signal comprising light at the second wavelength, the second outgoing optical signal including second PN code data that is time shifted relative to the first PN code data of the first outgoing optical signal;
directing the first and second outgoing optical signals towards a target to thereby cause at least a portion of the first optical signal and a portion of the second optical signal to be reflected from the target to provide return signal data;
detecting a return signal comprising at least a portion of the first signal that has been reflected from the target and a portion of the second signal that has been reflected from the target;
correlating the return signal data with the first and second PN code data to provide first and second distinct amplitude peaks corresponding to the portions of the first and second signals that have been reflected from the target, respectively;
determining a magnitude of the first amplitude peak;
determining a magnitude of the second amplitude peak;
utilizing the magnitudes of the first and second amplitude peaks to determine a relative absorption of the first and second signals.

2. The method of claim 1, including:
providing first and second continuous wave lasers that produce light having the first and second wavelengths, respectively; and wherein:
the first outgoing optical signal is generated by the first laser; and
the second outgoing optical signal is generated by the second laser.

3. The method of claim 2, wherein:
the first and second PN codes are substantially identical to one another except that the second PN code is time-shifted relative to the first PN code.

4. The method of claim 1, wherein:
the PN code comprises a m-sequence code.

5. The method of claim 1, wherein:
the first and second outgoing optical signals comprise a single amplitude modulated carrier.

6. The method of claim 1, wherein:
the first and second outgoing optical signals comprise a single frequency modulated carrier.

7. The method of claim 1, wherein:
first and second continuous wave lasers are utilized to generate the first and second outgoing optical signals.

8. The method of claim 1, wherein:
the PN code defines a length in bits;
the second PN code data is shifted by one half of the length of the PN code relative to the first PN code data.

9. The method of claim 1, including:
utilizing a time delay in at least one of the first and second outgoing optical signals to determine a range from the target.

10. The method of claim 1, including:
generating a third outgoing optical signal comprising light at a third wavelength that is not equal to the first wavelength or the second wavelength, the third outgoing optical signal including third PN code data that is time shifted relative to the first and second PN code data.

11. A method of measuring absorption utilizing a transmitted signal, the method comprising:
generating a first PN code;
generating a second PN code that is substantially orthogonal to the first PN code;
generating a first signal at a first frequency, the first signal including the first PN code;
generating a second signal at a second frequency that is not equal to the first frequency, the second signal including the second PN code;
directing the first and second signals towards a target to thereby cause at least a portion of the first signal and a portion of the second signal to be reflected from the target;
detecting a return signal comprising at least a portion of the first signal that has been reflected from the target and a portion of the second signal that has been reflected from the target;
correlating the return signal utilizing the first and second PN codes to provide first and second distinct amplitude peaks corresponding to the first and second PN codes;
determining magnitude of the first amplitude peak;
determining a magnitude of the second amplitude peak;
utilizing a ratio of the magnitudes of the first and second amplitude peaks to determine a relative absorption of the first and second signals;
wherein the first signal comprises light having a first wavelength, and the second signal comprises light having a second wavelength that is not equal to the first frequency;
providing first and second continuous wave lasers; wherein the first signal is generated by the first laser, and the second signal is generated by the second laser; and further wherein the first and second PN codes are substantially identical to one another except that the second PN code is time-shifted relative to the first PN code;
determining a maximum possible distance to a target; and wherein:
the delay generated for the second PN code corresponds to a distance that is greater than the maximum target distance, and wherein the maximum length for the first and second PN codes corresponds to a distance greater than twice the maximum possible distance to a target.

12. The method of claim 11, wherein:
the second PN code is shifted about one half of the maximum length of the first signal.

13. The method of claim 12, wherein:
the first and second lasers are mounted on an artificial satellite orbiting about a mass defining an outer surface;
the maximum possible distance comprises a maximum distance from the artificial satellite to the outer surface as the artificial satellite orbits about the mass.

14. A continuous wave laser ranging system, comprising:
a first laser that produces light having a first wavelength;
a second laser that produces light having a second wavelength that is not equal to the first wavelength;
a modulation device that modulates light from the first and second lasers whereby light originating from the first laser is modulated to provide a first optical signal comprising a first PN code, and light originating from the second laser is modulated to provide a second optical signal comprising a second PN code that is time shifted relative to the first PN code;
an optical transmitter that directs the time shifted first and second optical signals towards a target;
a receiver that receives a return signal including components of the first and second optical signals that have been reflected by the target;
a detector that converts the return signal into an electrical signal;
a processor that correlates the electrical signal and determines the magnitude of the first and second amplitude peaks corresponding to the first and second signals, respectively.

15. The continuous wave laser ranging system of claim 14, wherein:
the modulating device causes the first and second optical signals to comprise m-sequence PN codes.

16. The continuous wave laser ranging system of claim 15, wherein:
the PN codes of the first and second optical signals have substantially the same length.

17. The continuous wave laser ranging system of claim 16, wherein:
the PN code of the second optical signal is shifted relative to the PN code of the first optical signal by one-half the length of the first PN code optical signal.

18. The continuous wave laser range system of claim 14, wherein:
a single carrier is modulated by the first and second PN codes.

* * * * *